United States Patent
Teng et al.

(10) Patent No.: US 8,185,239 B2
(45) Date of Patent: May 22, 2012

(54) MOVING ROUTE PLANNING METHOD AND NAVIGATION METHOD FOR AVOIDING DYNAMIC HINDRANCES FOR MOBILE ROBOT DEVICE

(75) Inventors: You-Wei Teng, Jung-He (TW); Hung-Lun Liu, Jung-He (TW)

(73) Assignee: MSI Computer (Shenzhen) Co, Ltd., Shenzhen (CN)

( * ) Notice: Subject to any disclaimer, the term of this patent is extended or adjusted under 35 U.S.C. 154(b) by 665 days.

(21) Appl. No.: 12/270,825

(22) Filed: Nov. 13, 2008

(65) Prior Publication Data

US 2010/0121516 A1    May 13, 2010

(51) Int. Cl.
*G06F 19/00* (2011.01)
(52) U.S. Cl. ...................................................... 700/245
(58) Field of Classification Search .......... 700/245–264; 701/23–26, 200–207, 300, 400, 408, 410, 701/416; 901/1–50; 318/568.11, 568.12, 318/568.2
See application file for complete search history.

(56) References Cited

U.S. PATENT DOCUMENTS

| | | | |
|---|---|---|---|
| 2006/0241827 A1* | 10/2006 | Fukuchi et al. | 701/23 |
| 2008/0294288 A1* | 11/2008 | Yamauchi | 700/258 |
| 2009/0055020 A1* | 2/2009 | Jeong et al. | 700/251 |
| 2009/0182464 A1* | 7/2009 | Myeong et al. | 701/25 |

* cited by examiner

*Primary Examiner* — Mary Cheung
(74) *Attorney, Agent, or Firm* — Apex Juris, pllc; Tracy M. Heims (57) ABSTRACT

The present invention disclosed a moving route planning method for mobile robot device, which provides the moving route on a physical site for the mobile robot device. The method includes a first and a second steps; in which, the first step is to generate a relative mesh grid diagram based on a physical site, and the mesh grid map comprises a plurality of map grids containing hindrance parameter values, wherein the hindrance parameter values for each map grid are determined by the locations of hindrances within the physical site at relative locations; and, the second step is to continuously expand the map grid from the start point and the target point toward the neighbored map grids until the expanded map grids meet with each other, and to define each map grid in the expansion traces for meeting with each other as the moving route.

7 Claims, 11 Drawing Sheets

MOVING ROUTE PLANNING METHOD AND NAVIGATION METHOD FOR AVOIDING DYNAMIC HINDRANCES FOR MOBILE ROBOT DEVICE

FIELD OF THE INVENTION

The present invention relates to a moving route planning method and navigation method, and particularly relates to a moving route planning method and navigation method for avoiding dynamic hindrances for a mobile robot device.

BACKGROUND OF THE INVENTION

As for the subject of mobile robot device, such as a mobile robot, the route planning means to find a suitable route in a working environment with hindrances, that is, the moving route from the start point to the target point. In the route, the robot device can bypass all the hindrances safely and without collision in the moving process.

In one of the conventional techniques, it will re-plan the route when encountering new hindrances, and abort the original planned route. In another conventional technique, it will define a straight line between the start point and the target point as the planned route. If there is any hindrance on the straight line, it will turn left or turn right to bypass the hindrances. However, when encountering continuous hindrances, such as a wall, it will possibly not bypass the hindrances, that is, it will not reach the target point. Or, even it can bypass the hindrances to reach the target point that it will usually waste a lot of moving distances.

In view of the related conventional techniques having to be improved, the inventors of the present invention worked hard and proposed a moving route planning method and navigation method for avoiding dynamic hindrances for the mobile robot device, so as to eliminate the defects of the above-mentioned conventional techniques.

SUMMARY OF THE INVENTION

The first object of the present invention is to provide a moving route planning method applied in a mobile robot device, so that the mobile robot device in a physical site can plan a moving route at the start point and at the target point.

The second object of the present invention is to provide a navigation method for avoiding dynamic hindrances applied in a mobile robot device, so that the mobile robot device in a physical site can plan a moving route at the start point and at the target point, and avoid the dynamic hindrances to continuously move toward the destination.

In order to accomplish the first object of the present invention, the present invention provides a moving route planning method for mobile robot device as described in claim 1.

In order to accomplish the second object of the present invention, the present invention provides a navigation method for avoiding dynamic hindrances for mobile robot device as described in claim 7.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE INVENTION

Figure 1:
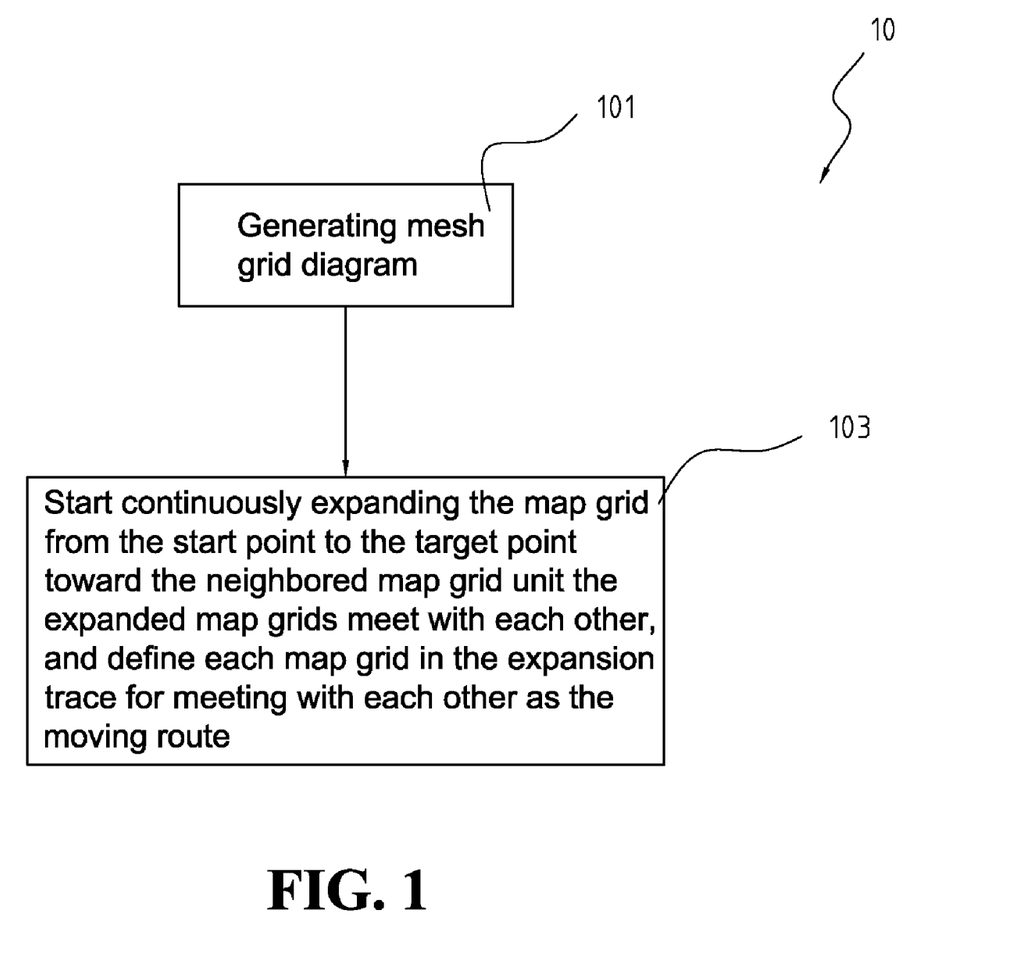
FIG. 1 is a flow chart of the moving route planning method for mobile robot device according to the present invention.

FIG. 1 shows a flow chart of the moving route planning method for a mobile robot device according to the present invention, and FIG. 2A~2D show the application diagrams of the moving route planning method in a physical site according to the present invention. The moving route planning method 10 for a mobile robot device according to the present invention includes the step 101 and step 103. Step 101 generates a relative mesh grid diagram 20 based on a physical site 5. The mesh grid diagram 20 comprises a plurality of map grids 201 containing hindrance parameter values, in which the hindrance parameter values for each map grid 201 are determined by the locations of hindrances in the physical site 5 at the relative location.

Figure 2A:
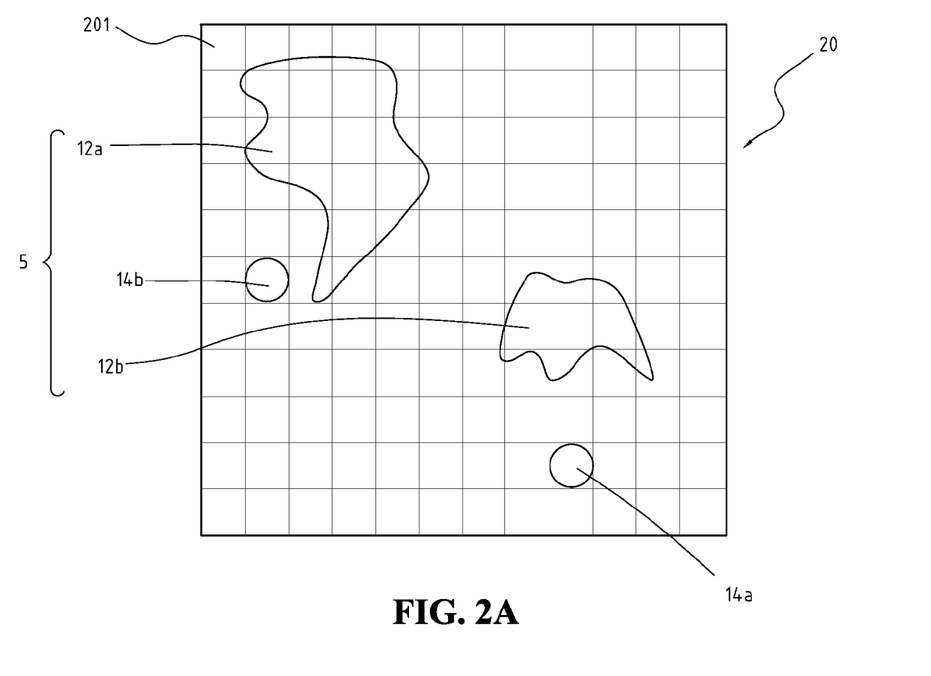
FIG. 2A~2D are the application diagrams of the moving route planning method in a physical site according to the present invention.
Figure 2B:
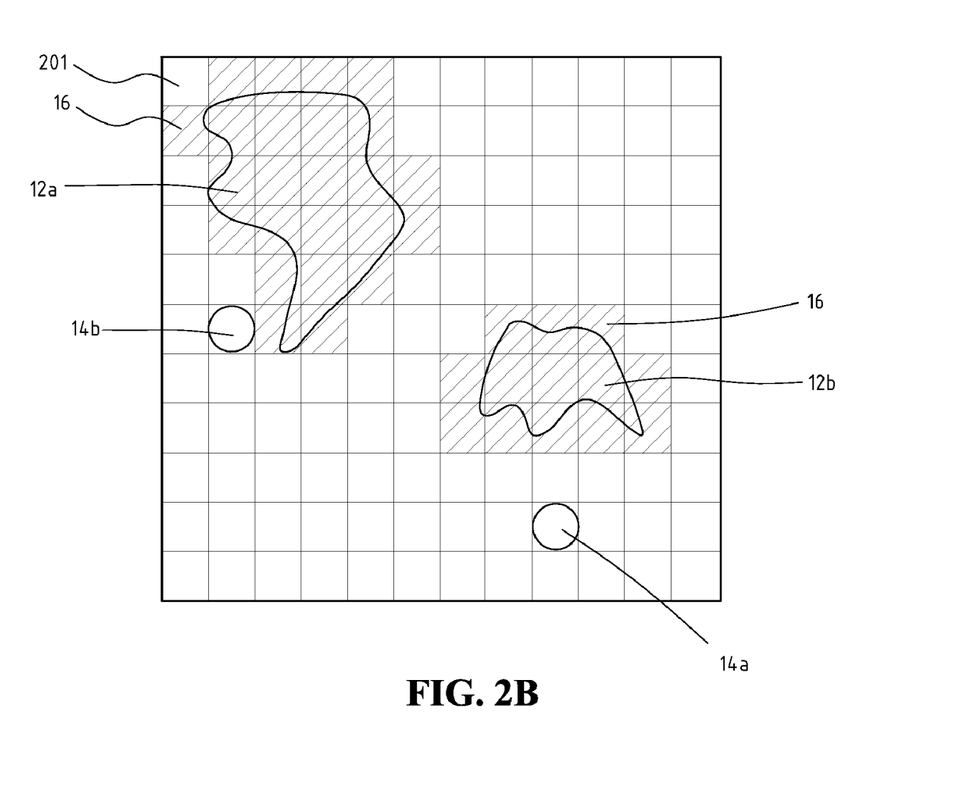

Please refer to FIG. 2A. The physical site 5 includes the hindrances 12a~12b. The mobile robot device (not shown), such as a robot, first reads the plane map of the physical site 5 and generates the relative mesh grid diagrams 20 based on the physical site 5. In the mesh grid diagram 20, it comprises a plurality of map grids 201 containing hindrance parameter values. The size for each map grid 201 can use 1 cm*1 cm, for example.

After completion of route planning, in order to provide the coordinate information about the moving route, the plurality of map grids 201 in the mesh grid diagram 20 can be given an identification number.

The hindrances 12a~12b appeared in the physical site 5 must be labeled in the mesh grid diagram 20 for the locations occupied by the hindrances 12a~12b. The hindrance parameter values for each map grid 201 are determined by the locations of the hindrances 12a~12b in the physical site 5 at the relative location. As for the block 16 labeled with hatched lines shown in FIG. 2B, the hindrance parameter values for the map grids 201 belonging to the block 16 will be all configured as "1", for example, and the hindrance parameter values for other unoccupied map grids 201 will be all configured as "0", for example. Moreover, in order to avoid the mobile robot device from moving outside the mesh grid diagram 20, the edges of the mesh grid diagram 20 can be defined as continuous hindrances, and the hindrance parameter values of these map grids 201 will be all configured as "1."

Step 103 is to continuously expand the map grid 201 from the start point 14a and the target point 14b toward the neighbored map grid 201 until the expanded map grids 201 meet with each other, and to define each map grid 201 in the expansion trace for meeting with each other as the moving route.

Figure 2C:
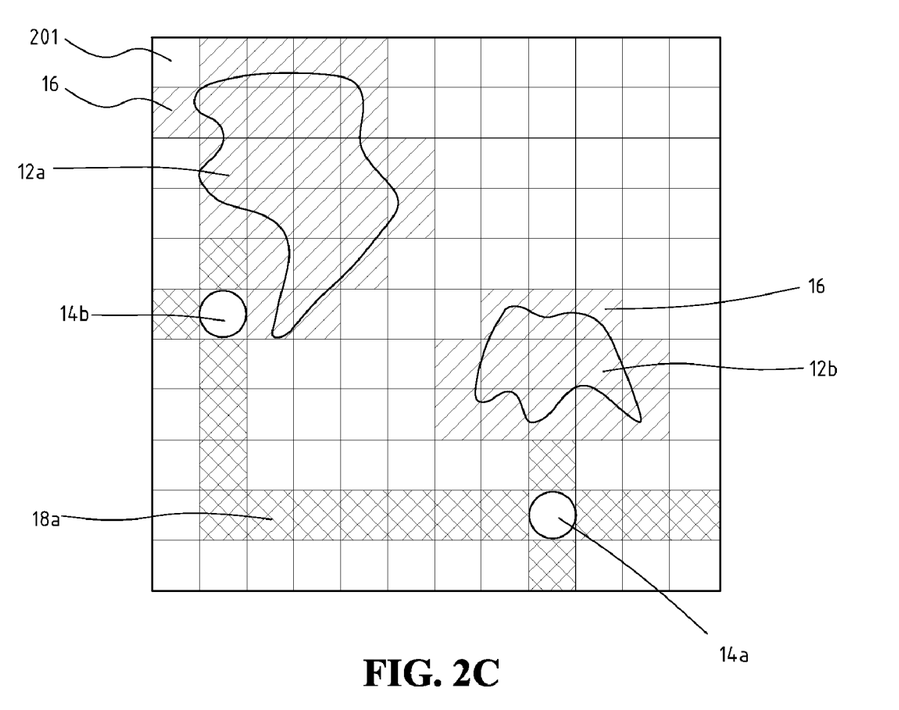

Please refer to FIG. 2C. According to the previous processing result in Step 101, the map grids 201 from the start point 14a and the target point 14b continuously expand toward the neighbored map grids until the expanded map grids 201 meet with each other, and defining each map grid 201 in the expansion trace for meeting with each other as the moving route 18. In other words, it just looks like the expansion of water waves by throwing two stones into a pool, and encountering at last. For example, when the map grids 201 continuously expand from the start point 14a and the target point 14b toward the neighbored map grids 201, the map grid 201 at the start point 14a and the map grid 201 at the target point 14b will continuously expand toward the map grids 201 in a cross shape, that is, up, down, left and right. The expanded map grids 201 will continuously expand toward the four neighbored map grids 201 in up, down, left and right directions until the expanded map grids 201 from the start point 14a and the target point 14b meet with each other, that is the location of the meeting point 18a.

Figure 2D:
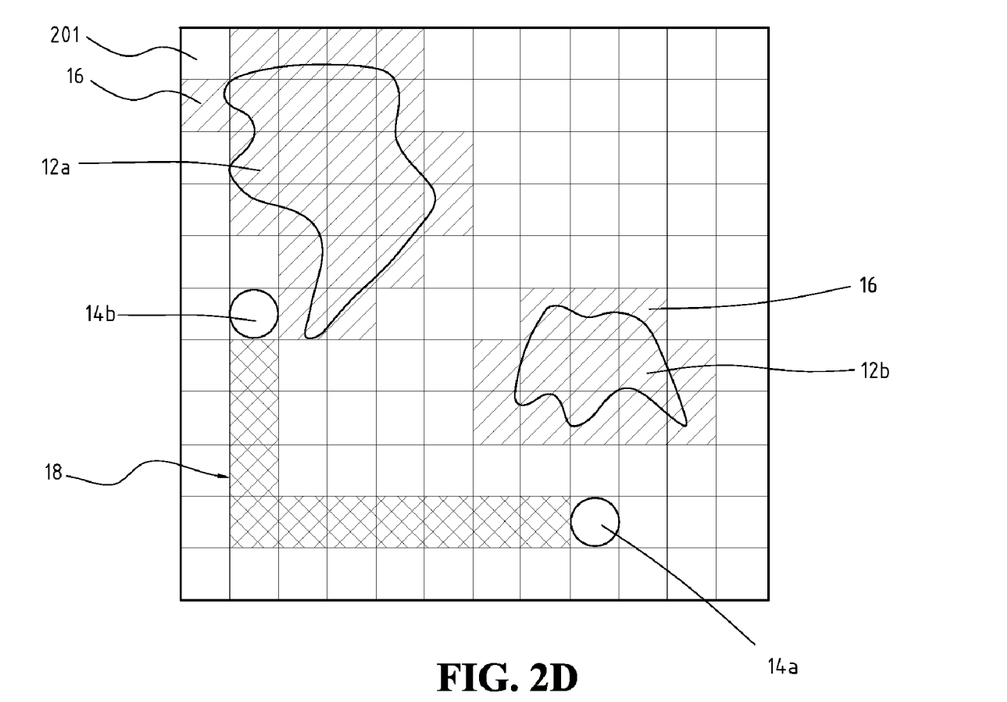

Then, the location at the meeting point 18a will be divided into two directions, which are respectively back to the start point 14a and the target point 14b, and forming the expansion trace from the meeting point 18a back to the start point 14a and the target point 14b, which are the passed map grids 201, and defining the two traces as the moving route 18, as shown in FIG. 2D.

Except of continuously expanding toward the neighbored map grids 201 in a cross shape, it can also continuously expand toward the eight neighbored map grids 201 in a "*" shape instead.

Because the mobile robot device occupies a certain projection area, such as 40 cm*40 cm, it should relatively adjust the occupied map grids 201 outwardly for the map grids occupied by the hindrances 12a~12b in the mesh grid diagram 5 according to the size of the mobile robot device. For example, it will expand outwardly 20 cm from the center point of the mobile robot device, and will add the protection range of 10 cm, so it will totally expand 30 cm outwardly, that is, the map grids occupied by the hindrances 12a, 12b will relatively be adjusted with 30 cm outwardly, and thus further adjusting to increase the occupied map grids 201. Similarly, the map grids 201 located on the edges of the mesh grid diagram 20 will be relatively adjusted with 30 cm outwardly, so as to further adjust to increase the occupied map grids 201.

Ideally, the planned moving route 18 can avoid the existed hindrances. However, in order to avoid the dynamic hindrances, which don't belong to the originally existed hindrances 12a, 12b in the physical site 5, the mobile robot device can be configured with sensors, such as infrared sensor or ultrasonic sensor, so as to anytime detect the dynamic hindrances encountered in the moving process.

Figure 3:
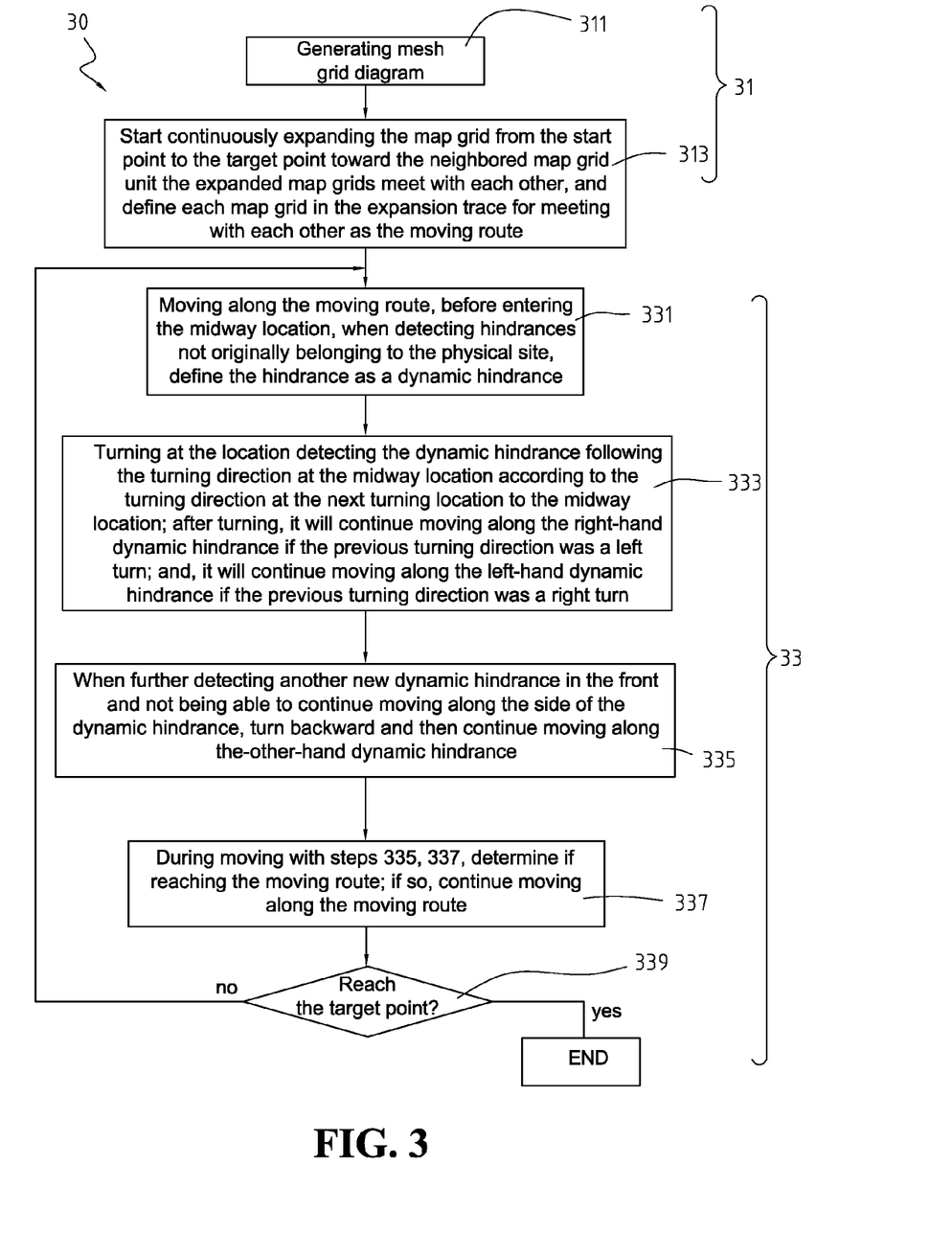
FIG. 3 is a flow chart of the navigation method for avoiding dynamic hindrances applied in the mobile robot device according to the present invention.
Figure 4A:
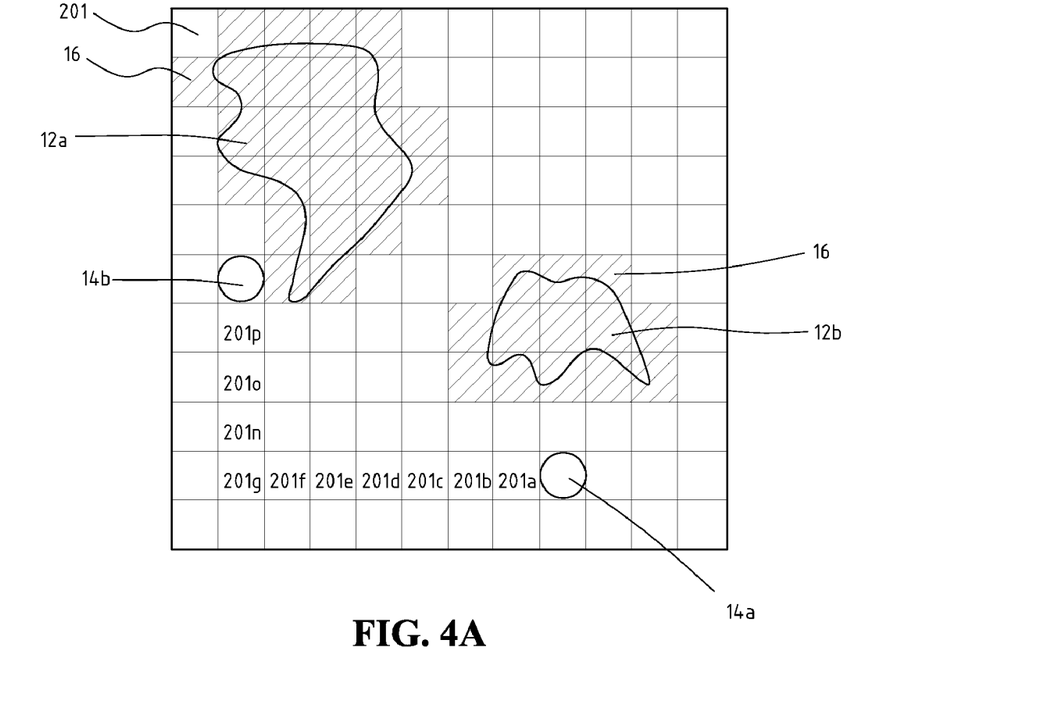
FIG. 4A~4C are the diagrams of the moving route in a physical site for the mobile robot device with the navigation method according to the present invention.
Figure 4B:
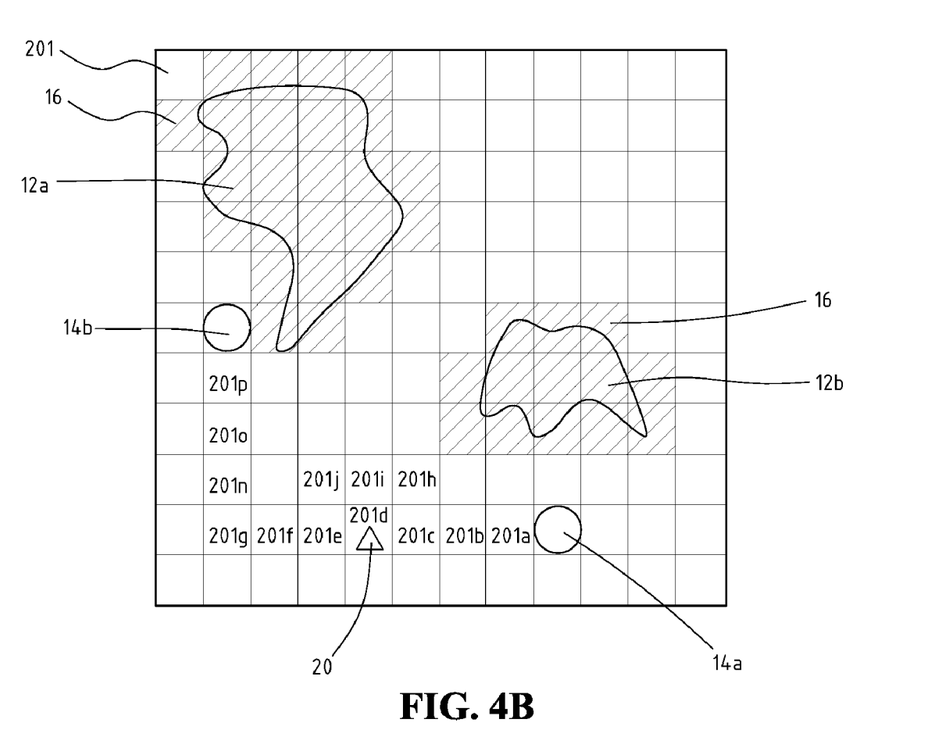
Figure 4C:
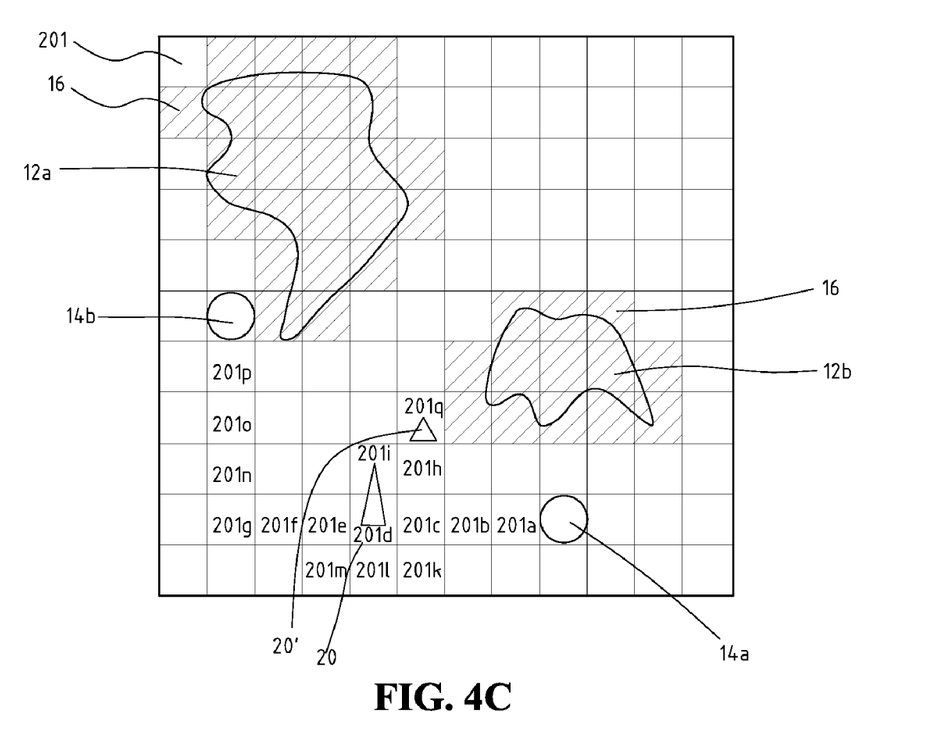

FIG. 3 shows a flow chart of the navigation method for avoiding dynamic hindrances applied in the mobile robot device according to the present invention, and FIG. 4A~4C show the diagrams of the moving route in a physical site for the mobile robot device with the navigation method according to the present invention. The navigation method 30 for avoiding dynamic hindrances applied in the mobile robot device according to the present invention includes the moving route planning step 31 and the moving step 33 for avoiding dynamic hindrances. The two steps 311, 313 of the moving route planning step 31 are respectively identical with the steps 101, 103, which will not be repeatedly described.

Referring to FIG. 4A, if there is not any dynamic hindrance in the moving route 18, the mobile robot device moving with the step 333 and the step 335 will move through the map grids 201 with identification numbers 201a, 201b, 201c, 201d, 201e, 201f, 201g, 201n, 201o and 201p, and finally reach the target point 14b.

In the step 331 of moving step 33 for avoiding dynamic hindrances, when moving along the moving route 18 from the moving route planning step 31 and before entering the midway location, it will detect the hindrances originally not belonging to the physical site, and then define the hindrances as dynamic hindrances 20. Referring to FIG. 4B, at the midway location in the moving route 18, the map grid 201 corresponding to the midway location with identification number 201d has a hindrance. The mobile robot device will move along the moving route 18 from the moving route planning step 31, and move through the map grids 201 with identification numbers 201a~201c. Before the mobile robot device moves to the midway location, that is, the map grid 201 with identification number 201c, the hindrance will be detected and defined as dynamic hindrance 20.

Next, in the step 333 of moving step 33 for avoiding dynamic hindrances, the turning direction is equal to that of the next turning location. The mobile robot device turns the turning direction at the location where it detects the dynamic hindrance 20. After turning, it will continue moving along the right-hand dynamic hindrance 20 if the previous turning direction was a left turn; and, it will continue moving along the left-hand dynamic hindrance 20 if the previous turning direction was a right turn.

Figure 5:
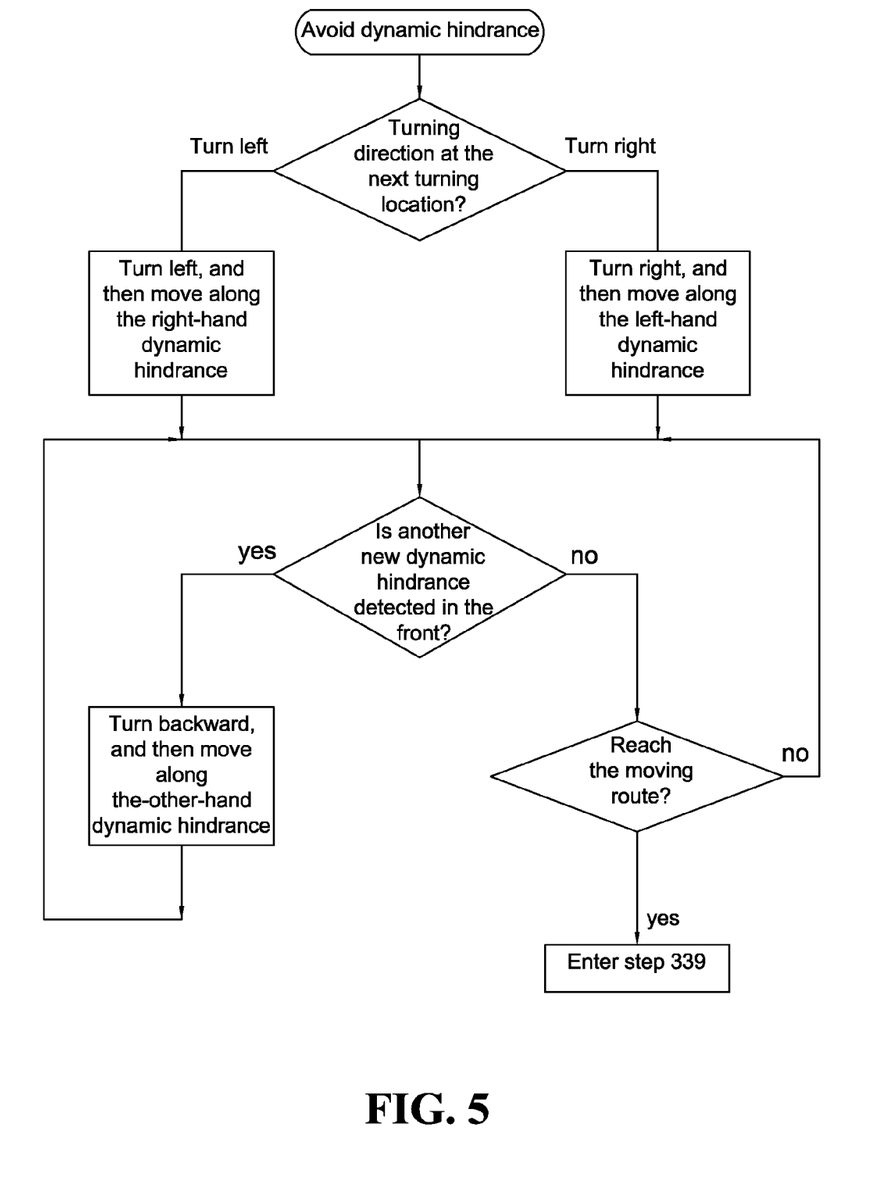
FIG. 5 is a flow chart about how to avoid the dynamic hindrances when the dynamic hindrances are detected according to the present invention.

Please refer to FIG. 4B and FIG. 5. As for the midway location, the next turning location at the midway location is the map grid 201 with identification number 201g. The turning direction at the map grid 201 with identification number 201g is a right turn. The mobile robot device will turn right at the map grid 201 with identification number 201c according to the turning direction at the next turning location. After the turning, the mobile robot device will determine which side of the dynamic hindrance to move along. If the previous turning direction was a left turn, it will continue moving along the right-hand dynamic hindrance 20; and, if the previous turning direction was a right turn, it will continue moving along the left-hand dynamic hindrance 20.

Following the example description of FIG. 4B, the mobile robot device will turn right at the map grid 201 with identification number 201c. After the right turn, then the mobile robot device will determine if the previous turning direction was a right turn, it will continue moving along the left-hand dynamic hindrance 20, and move through the map grids 201 with identification numbers 201h, 201i, 201j and 201e.

Furthermore, in the step 335 of moving step 33 for avoiding dynamic hindrances, if the mobile robot device has detected another new dynamic hindrance in the front and can not continue move along the dynamic hindrance 20, it will turn backward at the location. After turning backward, then it will continue moving along the-other-hand dynamic hindrance.

Please refer to FIG. 4C and FIG. 5. After detecting the dynamic hindrance 20, due to the right turn at the next turning point, the mobile robot device turned right at that time, and moved along the dynamic hindrance 20, which is the left-hand side of the mobile robot device. If the map grids occupied by the dynamic hindrances 20 are so many that the mobile robot device must still continue moving along the left-hand hindrance, for example the dynamic hindrance 20 in FIG. 4C occupies the map grids 201d, 201i, and if another dynamic hindrance 20' is detected in front of the mobile robot device, i.e. the map grid 201q in FIG. 4C has been occupied by the dynamic hindrance 20', that is, the mobile robot device will still encounter the hindrance moving along the left wall. Under such a circumstance, the mobile robot device will turn around.

At this time, the mobile robot device will turn backward at the map grid 201 with identification number 201h, that is 180° turn. After turning backward, then it will continue moving along the-other-hand dynamic hindrance 20, and the-otherhand side is the right-hand side. The mobile robot device continuing moving along the right-hand dynamic hindrance 20 will move through the map grids 201 with identification numbers 201c, 201k, 201l, 201m and 201e.

Next, in the step 337 of the moving step 33 for avoiding dynamic hindrances, when moving in the step 333 and the step 335, the mobile robot device will determine if it has reached the moving route 18; if so, it will continue moving along the moving route 18.

The mobile robot device moving with the step 333 and the step 335 will reach the map grid with identification number 201e. When reaching the map grid 201 with identification number 201e, the mobile robot device will determine it has reached the moving route 18.

Then, in the step 339 of moving step 33 for avoiding dynamic hindrances, it will repeat the step 331 to 337 until reaching the target point. The mobile robot device avoiding the dynamic hindrances 20, 20' will move through the map grids 201 with identification numbers 201f, 201g, 201n, 201o and 201p with the moving method from step 331 to step 337, and finally reach the target point 14b.

Figure 6:
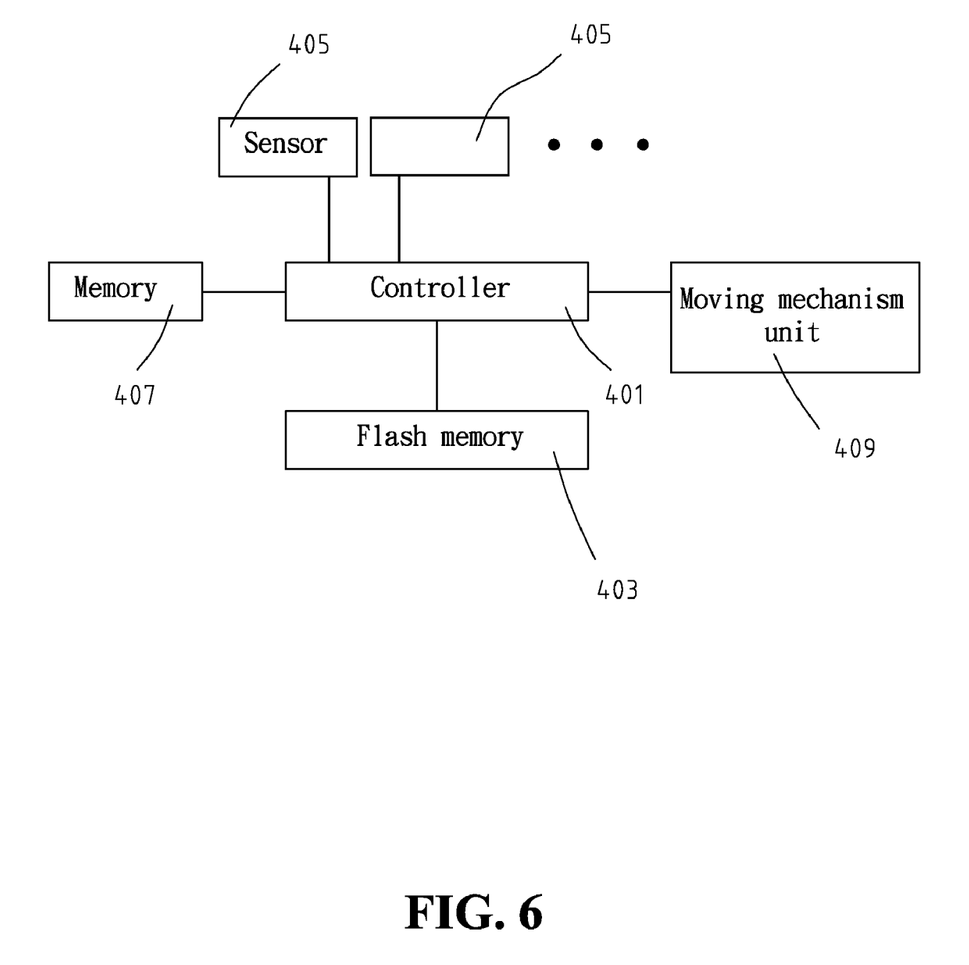
FIG. 6 is a structural diagram of the mobile robot device applied with the method according to the present invention.

FIG. 6 shows the structural diagram of the mobile robot device applying with the method according to the present invention. The hardware composition of the mobile robot device applying with the method according to the present invention may employ the prior art. The moving route planning method 10 and the navigation method 30 according to the present invention can be programmed into program codes, and the program codes are written in a flash memory 403. At least one sensor 405 is used to detect the hindrances. The controller 401 executes the program codes, and receives the signal generated by the sensors 405. The moving mechanism unit 409 is used to at least drive the mobile robot device moving forward, turning and stopping moving, and the moving mechanism unit 409 is controlled by the controller 401. Because the digital data for the relative mesh grid diagram 20 generated based on the physical site 5 is stored in the memory 407, and the memory 407 can employ the volatile memory and non-volatile memory.

In a summary, the moving route planning method and the navigation method for avoiding dynamic hindrances according to the present invention can be applied in the mobile robot device. Thus, it only needs to enter the digital map data corresponding to the physical site into the mobile robot device, and the mobile robot device will be able to plan the moving route from the start point to the target point, and rapidly avoid the dynamic hindrances based on the navigation method, and continue moving toward the destination, which is the benefit of the present invention.

The detailed description for the preferred embodiments are used to clearly describe the features and spirit of the prevent invention, but not limit the scope of the present invention with these disclosed preferred embodiments. On the opposite, the object is to cover all kinds of changes and equivalent arrangements within the scope of the claims applied in the present invention.

What is claimed is:

1. A moving route planning method for mobile robot device, which is used to provide a mobile robot device with the moving route in a physical site, the method includes the following steps:

a relative mesh grid diagram generated based on the physical site, and the mesh grid diagram comprises a plurality of map grids containing the hindrance parameter values, in which the hindrance parameter values for each map grid are determined by the location of a hindrance in the physical site at the relative location;

continuously expanding the map grid from a start point to a target point toward the neighbored map grids until the expanded map grids meet with each other, and defining each map grid in the expansion trace for meeting with each other as the moving route; and using the moving route by the mobile robot device and the mobile robot device moving along the moving route in the physical site.

2. The moving route planning method for mobile robot device according to claim 1, wherein the edges of the mesh grid diagram are defined as continuous hindrances.

3. The moving route planning method for mobile robot device according to claim 1, wherein the plurality of map grids in the mesh grid diagram further includes an identification number.

4. The moving route planning method for mobile robot device according to claim 1, wherein the step of continuously expanding the map grid from the start point to the target point toward the neighbored map grid is to continuously expand the map grid from the start point to the target point toward the neighbored map grid in a cross shape.

5. The moving route planning method for mobile robot device according to claim 1, wherein the step of continuously expanding the map grid from the start point to the target point toward the neighbored map grid is to continuously expand the map grid from the start point to the target point toward the neighbored map grid in a "*" shape.

6. The moving route planning method for mobile robot device according to claim 1, wherein the method is further based on the size of the mobile robot to further relatively adjust the occupied map grids outwardly for the map grids occupied by the hindrances in the mesh grid diagram, and to configure the hindrance parameter values for the map grids adjusted as occupied.

7. A navigation method for avoiding dynamic hindrances for mobile robot device, which includes the following steps:

the moving route planning step:

generating a relative mesh grid diagram based on the physical site, and the mesh grid diagram comprises a plurality of map grids containing the hindrance parameter values, in which the hindrance parameter values for each map grid are determined by the location of a hindrance in the physical site at the relative location;

continuously expanding the map grid from a start point to a target point toward the neighbored map grids until the expanded map grids meet with each other, and defining each map grid in the expansion trace for meeting with each other as the moving route; using the moving route by the mobile robot device and the mobile robot device moving along the moving route in the physical site;

the moving step for avoiding dynamic hindrances:

(a) the mobile robot device moving along the moving route from the moving route planning step, and, before entering a midway location and when detecting the hindrances not belonging to the original hindrances in the physical site, defining the hindrances as dynamic hindrances;

(b) the mobile robot device turning at the location detected with the dynamic hindrances following the turning direction according to the turning direction at the next turning location to the midway location, and, after turning, continuously moving along the right-hand dynamic hindrance if the previous turning direction was a left turn, and continuously moving along the left-hand dynamic hindrance if the previous turning direction was a right turn;

(c) if the mobile robot device further detecting another new dynamic hindrance in the front and being not able to continuously move along the side of the dynamic hindrance, the mobile robot device turning backwards at the location when detecting another new dynamic hindrance, and, after turning backwards, continuously moving along the other-hand dynamic hindrance;

(d) during the moving of step (b) and (c), the mobile robot device determining whether moving to the moving route, if so, continuously moving along the moving route; and, (e) the mobile robot device repeating step (a) to (d) until reaching the target point.

* * * * *